Aug. 19, 1969   E. FAHRBACH   3,462,305

MANUFACTURE OF TUBE ELECTRODES

Filed Oct. 10, 1966   2 Sheets-Sheet 1

INVENTOR
ERICH FAHRBACH
BY
ATTORNEYS.

Aug. 19, 1969 — E. FAHRBACH — 3,462,305

MANUFACTURE OF TUBE ELECTRODES

Filed Oct. 10, 1966 — 2 Sheets-Sheet 2

INVENTOR
ERICH FAHRBACH
BY:
ATTORNEYS.

ized conditions in order to hold the fabrics together. The thermoplastic fibers in the two fabrics are supposed to fuse together at their points of contact under heat and pressure to produce the desired bonding between them.

3,462,305
MANUFACTURE OF TUBE ELECTRODES
Erich Fahrbach, Weinheim, Bergstrasse, Germany, assignor to Carl Freudenberg, Weinheim, Bergstrasse, Germany, a corporation of Germany
Filed Oct. 10, 1966, Ser. No. 585,540
Claims priority, application Germany, Jan. 7, 1966, F 48,108
Int. Cl. H01m 1/04, 39/02
U.S. Cl. 136—38            10 Claims

ABSTRACT OF THE DISCLOSURE

Process for manufacturing tube electrodes which comprises forming a non-woven fabric of acid and/or alkali resistant fibers; impregnating such fabric with a relatively small amount of binder material; providing two of said fabrics superimposed one upon the other; sewing the two fabrics together along relatively parallel spaced paths; forming a series of tubes of said sewn-together fabrics, each of which tubes is bound by both the said fabrics and two adjacent stitch rows; and then reimpregnating the as formed row of tubes with additional binder and hardening such binder to provide a structure having significant dimensional stability.

---

This invention relates to electrodes. It more particularly refers to electrodes particularly adapted for use in so-called wet cells or storage batteries.

Storage batteries or accumulators are devices which convert chemical energy to electrical energy. Storage batteries are so constructed as to be able to reverse this process, that is, to put electrical energy into the system and convert the chemicals in the system back into a form which is capable of reaction to produce electrical energy. Thus in effect, storage batteries or accumulators are capable of receiving electrical energy and storing it for future discharge and use. The storage is accomplished by conversion of the input electrical energy into chemical energy and later converting the chemical energy back into useful electrical energy. A familiar example of such a storage battery is a Galvanic cell of the type used in automobiles for purposes of starting the engine.

In Galvanic cells of the lead-acid type, the positive electrodes are lead oxide and the negative electrodes are lead. One or more of each, the anode and the cathode, may be used with all anodes and all cathodes respectively connected in series or parallel as desired. Such a storage battery will be used throughout this specification as exemplary of this invention. It will of course be understood that this invention is not limited to such particular accumulator, but will find application in many varieties of secondary or rechargeable batteries.

It is traditional to use an acid electrolyte in lead-acid batteries and therefor the lead oxide positive electrode has often been provided as a lead grid having embedded in the grid meshes or interstices particles of lead oxide. It has also been traditional to provide the negative electrode as lead sponge. This finely divided, porous lead form gave excellent surface area of electrode and therefore relatively high capacity storage batteries.

Despite the fact that the traditional lead sponge-lead oxide particle-acid electrolyte storage batteries worked well in practice, it was sought to improve these devices by providing both positive and negative electrodes in tube form rather than in the plate form in which it had been the practice to provide the electrodes. These tubes have generally been made of acid resistant material with perforations or slits in them and then filled with suitable positive and negative electrode material. Hard rubber was one of the first materials used to form electrode tubes filled with lead and lead oxide powder respectively for the positive and negative electrode materials. These tube type electrodes have been used in substantially the same manner as were their predecessor plate shaped electrodes.

The art then proceded from solid tube electrodes having perforations or slits therein to porous electrodes wherein the natural or induced porosity of the electrode tube material was sufficient to permit electrical and chemical contact between the electrolyte and the electrode materials. Such naturally occurring porous materials which are resistant to acids as clays have been used to replace the slitted hard rubber tubes.

In order to increase the activity and capacity of storage batteries using tube type electrodes, groups of tubes were used in place of a single tube as both or either the anode and the cathode. The term, tube type electrodes, has been used in this art to refer to both single tube electrodes and multiple tube electrodes as described above.

Tube electrode storage batteries as produced by the prior art are operative and perhaps even superior to the plate type electrode containing batteries which had come before them. However, there is still room for improvement in these devices.

Particularly, hard rubber tube electrodes suffer from the disadvantage that hard rubber is not resistant to the acid electrolyte of storage batteries for a prolonged period of time. After some useful life, the rubber tends to be attacked by the acid and to decompose.

The naturally porous materials or their equivalents from which tube electrodes were constructed depended for reaction and conductivity upon their porous structure. In time, with the electro-chemical reaction proceeding reversibly, substantially all or at least a large part of the time, the pores became clogged thereby cutting down upon the effective electrode surface area and thus the capacity of the battery. If such electrodes were permitted in service for even longer, it is possible that so much of the pore volume was filled and clogged with deposits that the battery could cease to function in such a manner as to produce useful amounts of electrical output.

The next logical step for the art to take, considering the fact that tube electrodes are considered superior to their predecessor plate form electrodes, was to attempt to improve upon the nature of the tube materials in order to overcome the difficulties presented by the prior art tube materials.

It is natural that, in this quest for improved tube materials, the art should at some point turn to textiles. It is possible when working with textiles to substantially tailor-make the tube construction to whatever form and physical properties, within limits, are desired. Thus, it is possible to control the mesh dimensions of any given textile by adjusting the weaving or knitting parameters by which the textile fabric is produced. Similarly, the acid resistivity can be substantially predetermined by proper choice of the chemical nature of the textile filamentary material use. Also, it is practical in many cases to tailor-make fabrics to build-in certain properties which may be desirable, e.g., stretchability can be incorporated by using shrinkable fibers.

Various proposals have been made for use of different textiles and textile constructions in this application. For example, U.S. Patent No. 2,972,000 shows that tube electrodes, and particularly a group of tube electrodes, can be produced by laying two textile fabrics made of acid resistant fibers on top of each other. Though acid resistant, these fabrics must have a significant degree of thermoplasticity. The thermoplastic nature of fibers is necessary because the two fabric composite is subjected to heat sealing of the fabrics together along generally parallel lines. This is suitably accomplished by subjecting the fabric composite to the action of parallel corrugated presses with the corrugations matching in a male-male relationship to heat seal the two fabrics along several generally parallel lines and thereby form a group of tube electrode housings which can be filled with suitable electrode material. As mentioned above, the fabric must exhibit at least some degree of thermoplasticity in order for the heat seal referred to above to be accomplished. This thermoplasticity can be obtained by use of thermoplastic fibers in the fabric. All or any part of such fibers may be thermoplastic so long as there is a sufficient proportion to permit heat sealing of the fabrics. Thermoplasticity can also be introduced into a non-thermoplastic fabric through the use of a thermoplastic binder or impregnant.

While good tube electrodes and good banks of tube electrodes have been fashioned in this manner, a distinct disadvantage lies in the fact that a different size die must be used for each different electrode size, both as to tube diameter and as to tube length. In addition, the welds in the woven fabric have a tendency to become brittle thus causing or permitting the tubes to break apart during use. Additionally, woven fabrics have the tendency to permit particles of active electrode material, lead or lead oxide to drop out through the woven fabric mesh during charging and discharging of the accumulator, particularly during the beginning of operation of the accumulator. As repeated charging and discharging of the accumulator is accomplished, those particles of active electrode material which do not fall out have a tendency to become lodged in and to clog the fabric mesh, thus disturbing the freedom of passage of the ions through the fabric material.

Attempts have been made to eliminate the disadvantages incurred by the use of woven mesh fabrics. See, for example, German Green Patent 1,184,827, U.S. Patents 2,511,877, 2,350,752, 2,343,970, German Patent 1,063,232, German Green Patent 1,110,256, U.S. Patents 2,176,428 and 2,266,544. In these attempted improvements, special thread arrangements have been tried without any notable degree of success.

Attempts have been made to replace the woven fabrics known in the art with non-woven fabrics in order to eliminate or at least reduce the drop-out of active electrode materials and the clogging of fabric mesh. Non-wovens have succeeded in improving the situation in that their internal structure, while extremely porous, does not contain significantly wide mesh openings through which active electrode particles can pass and either get lost or become trapped and tend to clog the mesh. Rather, non-woven fabrics are composed of multiple fibers random oriented which are substantially randomly tangled and joined or cemented together at fiber intersections. Such fabrics which are suited to use in the manufacture of tube electrodes are illustrated in German Patent 1,161,120.

Thus is it seen that fibrous, or for that matter, any tube electrode must have certain characteristics in order to perform adequately:

(1) They must receive and hold the active electrode material not permitting a significant (and preferably none) amount of such material to escape or leave the interior of the tube;

(2) They must be inert to the electrolyte but must additionally be porous to this electrolyte thus permitting the electrolyte access to the active electrode material;

(3) They must be sufficiently elastic to permit the contained active electrode particles to change in volume during the operation of the accumulator, i.e. charging and discharging thereof; and (4) They must be sufficiently sturdily constructed so as not to break apart or crack during or prior to usage.

It is therefor an object of this invention to provide a novel tube electrode construction.

It is another object of this invention to provide a novel fibrous tube electrode construction.

It is a further object of this invention to provide a non-woven fabric tube electrode construction which is superior to those of the prior art.

It is a still further object of this invention to provide a novel process for the production of non-woven fabric tube electrodes.

Other and additional objects of this invention will become apparent from a consideration of this entire specification, including the claims and drawings appended hereto.

In accord with and fulfilling these objects, this invention resides, in one of its aspects, in the provision of a tube electrode casing comprising two appropriately sized sheets of non-woven textile fabric, comprising fibers which are resistant to the electrolyte medium, stitched together at appropriate intervals to form multiple sleeves of suitable diameter.

Since electric accumulators or storage batteries operate with a strongly alkaline or acid electrolyte medium, it is necessary that the electrode construction material be one which is resistant to such materials. In this regard, glass fibers and polyolefin fibers are useful. It is also possible to use polyester fibers, although sleeves made of this material are only resistant to acid electrolyte medium. It is even preferred to use polyester tube electrode casings in an acid electrolyte medium, because the wettability of this fiber material is extremely high. This is favorable for the workability of the storage battery.

Understanding of this invention will be facilitated by reference to the drawings, in which.

Figure 1:
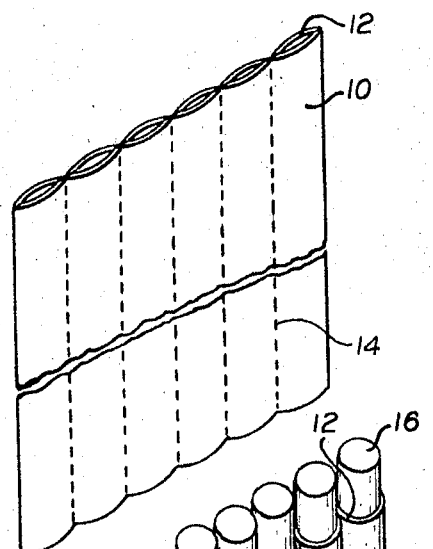
FIG. 1 is an isometric view of two non-woven fabric batts appropriately stitched together.

Referring now to this drawing and particularly to FIG. 1 thereof, two sheets of non-woven textile fibers (10) and (12) are each suitably prepared for use in this invention. These sheets may be of finite dimensions, that is, have a given length and width, or they may be part of a substantially endless roll of non-woven textile batting of any desired width. The batting is constructed of intertangled fibers either in short lengths, e.g. staple fibers or is produced from continuous filament in the known manner.

The intertangled non-woven batting is suitably needled in order to force some of the fibers or portions of fibers into positions substantially perpendicular to the plane of the batting. This needling step tends to maintain the batt in a coherent structure and prevents delamination of the various substantially planar layers of fibers which make up the batt. After needling the batt has much more strength than it did prior to needling. For a discussion of needling see "Textile Industries," September 1958, page 117.

However, it is desirable in the practice of this invention to impregnate the needled batting with a binding agent which will tend to adhere the fibers of the batt together and produce a still more coherent structure. The binder impregnation is suitably carried out in a sequence of steps for best results. First the needled batt is impregnated with small amounts of binder and the impregnated batt is dried. A suitable proportion of impregnant binder is about 5 to 15 percent by weight of the total weight of impregnated batt, preferably about 10 percent by weight binder. A second impregnation with binder will be accomplished later in the production process which will hereinafter be referred to and described.

After the first binder impregnation and drying of the impregnated batts, two sections of batting (10) and (12), either of finite dimensions or derived from a substantially endless roll of batting, are placed one on top of the other in such manner that all or at least two of the opposite sides are in registry. This latter point of registry of the sides of the non-woven fabrics is not particularly critical but is helpful in maintaining efficient accurate production.

The superimposed batts are then stitched down (14) for convenience, in substantially parallel paths suitably substantially parallel to one edge of the batts preferably one shorter edge of the batts. The stitched down batts are then reimpregnated with a larger quantity of additional binder material and the impregnated batt again dried. The quantity of binder utilized in the second impregnation is suitably between about 25 and 50 percent by weight of the total weight of the reimpregnated batts. It is preferred that the second binder impregnation impart about 30 to 40 percent by weight of binder based upon the total impregnated batt weight.

It is preferred in the practice of this invention that the drying of the secondly impregnated binder take place at somewhat lower temperatures than those at which the firstly impregnated binder was dried. For example, it is advantageous to perform the drying of the firstly impregnated binder at about 150 to 160° C. and to perform the drying of the secondly impregnated binder at about 130 to 140° C. It is within the scope of this invention to introduce all of the binder in a single impregnation or to use more than two impregnations to incorporate all of the desired binder into the batt.

The fibers from which the batts used in the instant invention are made are advantageously shrinkable to at least some extent. These fibers, or at least a portion of them, exhibit what is called reversible shrinkage. Suitably about 10 to 100 weight percent of the fibers used in the batts of this invention exhibit this property of reversible shrinkage. This desirable property can be described and characterized as being shrinkable by exposure to moderately high temperatures, e.g., about 170 to 190° C., that is, between the drying temperature of the binder impregnated batt and the hardening temperatures of the binder. Further, these reversible shrinkage fibers have the additional property of being at least somewhat elastic after said shrinkage occurs.

Impregnant binders useful in this invention are those materials which are compatible with and adhere to the fibers of the non-woven batt. The chosen binders must, in addition, be substantially inert to the electrolyte and electrode material used in the accumulator. Exemplary binders which have been found to be suitable are polyesters and polyacrylics. Suitably, the same polymer may be used as a binder as was used to produce the fibers which form the non-woven batt. Thus, the polyesters set forth above make good binders. In addition, acrylic acid ester homo- and copolymers have been found to be suitable. These are exemplified by ethyl acrylate, methyl methacrylate, butyl acrylate, 2-ethylhexyl acrylate and methacrylate, hydroxyethyl methacrylate, hydroxypropyl acrylate, acrylonitrile/butadiene/styrene resins, either terpolymer or mixed copolymers, and other similar materials in homo- or copolymers formulations.

Figure 2:
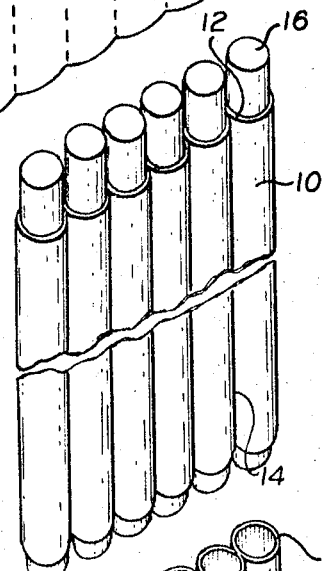
FIG. 2 is an isometric view of the stitched batts of FIG. 1 having rods inserted into the sleeves formed by the stitching and the batts.
Figure 3:
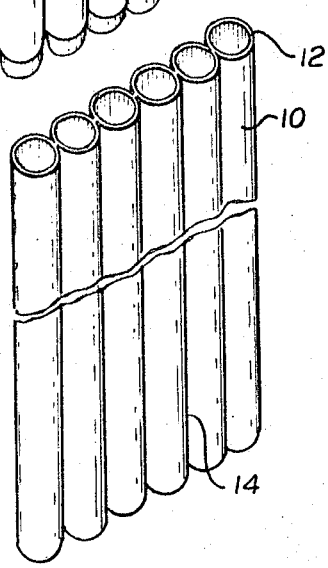
FIG. 3 is an isometric view of a finished tube electrode casing according to this invention.

Referring now to FIG. 2 of the drawing, the stitched down binder impregnated batts are akin to a series of sleeves joined along the lengths thereof. Into each of these sleeves is inserted a metal bar 16 having a smooth surface and a suitable cross-section, preferably circular or elliptical, as desired. If desired, a lubricant can be applied to the surface of the metal bars in order to facilitate insertion of the bars into the sleeves. A convenient lubricant is one which retains its lubricity and is not fugitive at the hardening temperature of the binder resin, e.g. a silicone liquid resin oil.

The stitched down binder containing fabric having the metal bars of suitable cross-sectional shape and size is then subjected to conditions sufficient to harden the binder resin and shrink the fibers. One condition eminently suited to hardening of the binder resin is the application of heat. For a binder resin of polyethyl acrylate, composition, temperatures of about 200 to 230° C. have been found to be suitable.

As the impregnated batt heats up to about 170° C. those fibers of the batt which exhibit reversible shrinkage shrink and form a relatively snug fit about the inserted metal bars. As a result of this shrinkage, the inside walls of the sleeves conform to the shape and surface of the metal bars and become smooth. As the impregnated batt heats up further, the binder hardens thus relatively fixing and stiffening the shape and surface characteristics of the sleeves. After the binder resin has become hardened, the metal tubes are removed from the sleeves thus leaving the sleeves in proper shape for use as tube electrode casings.

Figure 4:
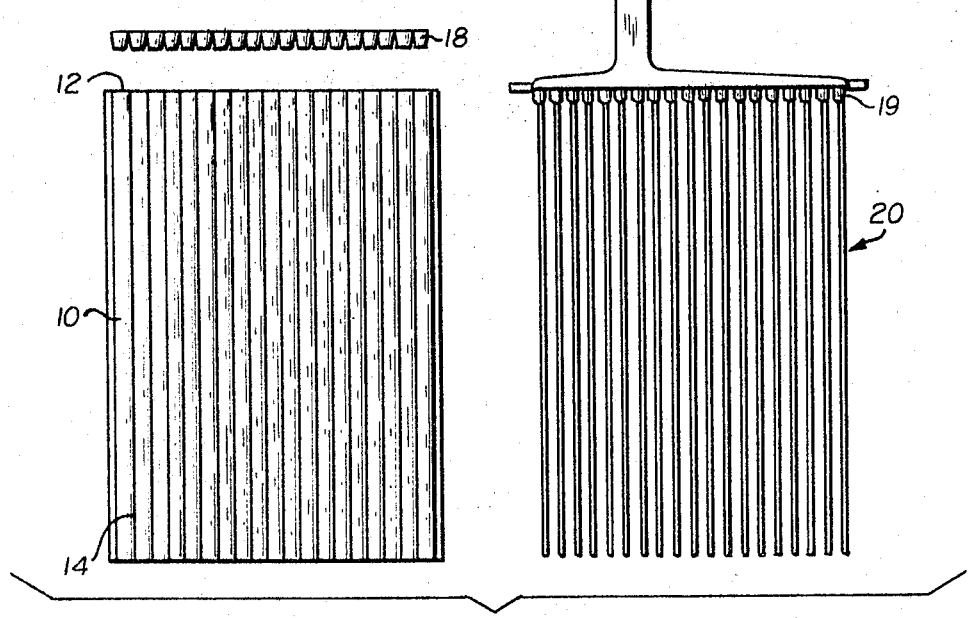
FIG. 4 is a front elevation in fragmentary view of a tube electrode according to this invention, electrode armatures therefore and end caps therefore.
Figure 5:
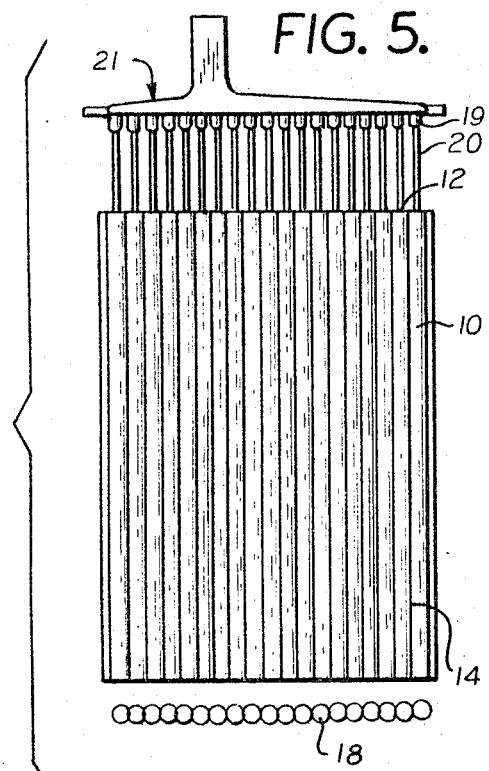
FIG. 5 is a front elevation of a tube electrode casing of this invention showing the insertion of electrode armatures and bottom end caps for these tube electrodes.
Figure 6:
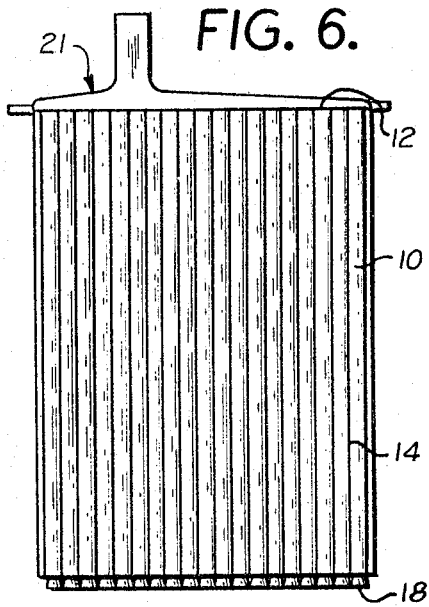
FIG. 6 is a front elevation of a fully assembled tube electrode according to this invention.

One edge of the row of sleeves perpendicular to the direction of stitching may be closed in any convenient manner, as for example, by plugs 18 as shown in FIGS. 4, 5 and 6, so as to provide each sleeve as a pocket into which suitable active electrode materials can be inserted as powder, granules or particles of any given size and shape. Electrode armatures 20 are suitably inserted into the tubes.

In a preferred mode of construction, the electrode armatures are suitably so formed as to provide the end of the armatures 20 at the juncture with the tie bar 21 in the form of an armature plug 19. The armature assembly is inserted into the sleeves 10 in such a manner that the armature plug 19 closes one end of the sleeves 10 and the sleeve-armature assembly is positioned to receive particulate electrode material therein which will substantially fill the sleeves 10 and make good electrical contact with the armatures 20. It has been found convenient to maintain the sleeve armature assembly vertical with the open end up during filling thereof with particulate electrode material. After filling the sleeves 10 with suitable electrode material, the above-referred to plugs 18 are inserted to close the open end of the sleeves 10 and complete formation of the tube electrode. This formed tube electrode can be used in any convenient spatial position desired.

The residual elasticity of the reversibly shrinkable fibers of the batt render the tube electrode casing sufficiently flexible to account for the expansions and contractions of the active electrode material contained therein during operation of an accumulator, including both the charging and the discharging cycles.

It has been found that the preferred batt shrinkage during heat hardening of the impregnated binder is about 6 to 7 percent since this provides both smooth inside walls in the sleeves and a grip upon the metal bars which is not so tight as to present difficulties upon removal of such bars after hardening.

In a specific example of the practice of this invention, a polyester fiber, Trevira W-15, manufactured by Farbwerke Hoechst, was used in the formation of a non-woven batt was non-shrinkable polyester fiber. This about 100 grams per square meter and a content of about 10 weight percent of such shrinkable polyester fiber. The remainder of the fiber content of the non-woven batt was non-shrinkable polyester fiber. This batt was needled and formed into two pieces each measuring about 50 by 100 centimeters. Each of these fabrics was impregnated with a water dispersion of an acrylate polymeric resin, Palalal KR–1177, manufactured by Badische Anilin und Soda Fabrik, to such an extent that the batt weight increased, after drying at 150 to 160° C., from 100 to 110 grams per square meter. The two impregnated fabrics were superimposed and stitched down at 14 millimeter intervals parallel to the short side of the fabric.

The stitched down fabric was then impregnated again with the same polymeric dispersion, whereby, after drying at about 140° C., the weight of the impregnated batt was increased to about 175 grams per square meter.

Metal bars of circular cross-section were inserted into the sleeves formed by stitching down. The batts were then placed in an over preheated to 200 to 230° C. for about 20 minutes. During this heating period, the batts shrunk about 6 percent and the binder resin hardened to form a structure which was relatively rigid and self-supporting in the desired shape even after removal of the metal bars.

Since upper and lower molds are not required in the process of the invention, the process is simpler than those of the prior art. Whereas hitherto a mold has been required for each tube diameter, it is now sufficient to locate the seams at appropriate distances apart.

The tube electrodes manufactured by the process of the application operate perfectly even if the electrolyte liquid attacks the binder after long use. In fact, the tube electrodes have been found to retain their operability even if as much as 30 weight percent of the binder is rendered ineffective through electrolyte attack. If, however, a batting that has been impregnated with the same binding agent, but has not been needled, is used, the tube falls apart when the binding agent is damaged. In the tube electrodes according to the application, on the other hand, the active material is always uniformly and elastically enveloped by the shell, which is one consequence of the use of shrink fibers in a needled batting.

What is claimed is:

1. A process of producing tube electrodes, which comprises forming a non-woven batt of strong acid- and strong alkali resistant intertangled textile fibers, needling said batt, providing at least two distinct pieces of said batt, superimposing said pieces, providing rows of stitching at spaced intervals running in substantially the same direction joining said pieces of batt, whereby to form sleeves in said joined pieces of batt; impregnating said batt with a hardenable strong acid- and strong alkali resistant polymeric resin, inserting bars into said sleeves, hardening said binder while said bars are inserted in said sleeves, and removing said bars from said sleeves, whereby to form a substantially self-supporting fabric structure having dimensional integrity.

2. Process as claimed in claim 1, wherein said batt is impregnated with said binder in at least two sequential applications.

3. Process as claimed in claim 1, wherein at least some of the fibers of said batt exhibit reversible shrinkage such that said product is expandable.

4. Process as claimed in claim 1, wherein said nonwoven fabric comprises fibers made from polyester polymer.

5. Process as claimed in claim 1, wherein said binder is a polymeric material selected from the group consisting of polyacrylates and polyesters.

6. Process as claimed in claim 1, wherein an active electrode material is inserted into said sleeves.

7. Process as claimed in claim 2, wherein a first impregnation of binder is accomplished prior to said stitching; and a second impregnation of said binder is accomplished after said stitching.

8. Process as claimed in claim 3, wherein said fibers exhibiting reversible shrinkage constitute about 10 to 100 percent of said batt.

9. Process as claimed in claim 6, wherein said active electrode material is lead oxide.

10. Process as claimed in claim 8, wherein said binder constitutes about 25 to 30 percent of the total weight of binder and fibers.

References Cited
UNITED STATES PATENTS

| | | | |
|---|---|---|---|
| 2,972,000 | 2/1961 | Boriolo | 136—43 |
| 3,207,632 | 9/1965 | Dickover et al. | 136—43 |
| 3,216,864 | 11/1965 | Bushrod et al. | 136—43 |
| 3,266,935 | 8/1966 | Boriolo | 136—43 |

WINSTON A. DOUGLAS, Primary Examiner

C. F. LEFEVOUR, Assistant Examiner

U.S. Cl. X.R.

136—43

PO-1050
(5/69)

UNITED STATES PATENT OFFICE
CERTIFICATE OF CORRECTION

Patent No. 3,462,305          Dated  August 19, 1969

Inventor(s)  ERICH FAHRBACH

It is certified that error appears in the above-identified patent and that said Letters Patent are hereby corrected as shown below:

Column 1, line 25, after "stability" insert --The product made by the above-described process is also designated--

Column 6, line 63, after "batt" insert --of intertangled fibers having a weight of--; same line cancel "was non-shrinkable polyester fiber. This" ;

SIGNED AND
SEALED
FEB 24 1970

(SEAL)
Attest:

Edward M. Fletcher, Jr.
Attesting Officer

WILLIAM E. SCHUYLER, JR.
Commissioner of Patents